United States Patent
Pientka et al.

[11] Patent Number: 5,872,437
[45] Date of Patent: Feb. 16, 1999

[54] DEVICE FOR OPERATING A WINDSHIELD WIPER

[75] Inventors: Rainer Pientka, Achern; Henry Blitzke, Buehl; Joerg Buerkle, Offenburg, all of Germany

[73] Assignee: Robert Bosch GmbH, Stuttgart, Germany

[21] Appl. No.: 776,014

[22] PCT Filed: Apr. 17, 1996

[86] PCT No.: PCT/DE96/00668

§ 371 Date: Jan. 16, 1997

§ 102(e) Date: Jan. 16, 1997

[87] PCT Pub. No.: WO96/37388

PCT Pub. Date: Nov. 28, 1996

[30] Foreign Application Priority Data

May 27, 1995 [DE] Germany ............... 195 19 485.3

[51] Int. Cl.$^6$ ............................................. B60S 1/00
[52] U.S. Cl. ................... 318/444; 318/483; 318/DIG. 2
[58] Field of Search ...................... 318/280–293, 318/434–483, DIG. 2; 15/DIG. 15, 250.001, 250.12, 250.17; 340/601, 438, 439

[56] References Cited

U.S. PATENT DOCUMENTS

| | | | |
|---|---|---|---|
| 4,859,867 | 8/1989 | Larson et al. | 318/444 |
| 4,867,561 | 9/1989 | Fuji et al. | 318/483 |
| 4,956,591 | 9/1990 | Schierbeek et al. | 318/483 |
| 5,023,467 | 6/1991 | Uhl | 307/10.1 |
| 5,059,877 | 10/1991 | Teder | 318/444 |
| 5,119,002 | 6/1992 | Kato et al. | |
| 5,225,669 | 7/1993 | Hasch et al. | 250/214 |
| 5,239,244 | 8/1993 | Teder | 318/444 |
| 5,252,898 | 10/1993 | Nolting et al. | 318/444 |
| 5,568,027 | 10/1996 | Teder | 318/483 |
| 5,581,240 | 12/1996 | Egger | 318/483 |
| 5,648,707 | 7/1997 | Salliotte | 318/443 |
| 5,666,037 | 9/1997 | Reime | 318/483 |
| 5,684,464 | 11/1997 | Egger | 318/483 |
| 5,694,012 | 12/1997 | Pientka et al. | 318/444 |
| 5,703,568 | 12/1997 | Hegyi | 318/483 |

*Primary Examiner*—Paul Ip
*Attorney, Agent, or Firm*—Venable; George H. Spencer; Norman N. Kunitz

[57] ABSTRACT

A arrangement for operating a windshield wiper in a direct mode, an intermittent mode or a continuous mode, having a sensor device for detecting a degree of moisture on the windshield, an evaluation device for the sensor signal and an actuation unit for the windshield wiper. A non-disturbing smoothing of the interval times is accomplished in a simple manner in that an interval time control has a smoothing stage for the interval time with which it can be determined during which time segment of predetermined time segments within the interval time a wetting event occurs, starting from the beginning of the interval, and with which the second interval time can be shortened all the more, the earlier the time segment appears during which the wetting event occurs.

16 Claims, 1 Drawing Sheet

DEVICE FOR OPERATING A WINDSHIELD WIPER

This application is a 371 of PCT/DE 96/00668 filed Apr. 17, 1996.

BACKGROUND OF THE INVENTION

The invention relates to an arrangement for operating a windshield wiper in either a direct mode, wherein, in the event of a wetting event on the windshield, a wiping action is triggered directly, in an intermittent mode wherein, in the event of a corresponding wetting event, a sequence of wiping actions with a predeterminable interval time is triggered, or in a continuous mode, wherein wiping actions follow one another without a break, with the arrangement having a sensor device for detecting the degree of moisture on the windshield and for emitting a sensor signal, having an evaluation device receiving the sensor signal, which evaluation device is provided with a moisture-detecting stage, an interval time control and a control signal generating device, and having an actuation unit for the windshield wiper which can be actuated by the evaluation device to produce the wiping actions.

An arrangement of this type has been revealed as being known in DE 40 18 903 C2. In this known arrangement, the wiping operation is controlled on the basis of a sensor signal of a sensor device, which signal is evaluated by an evaluation device. An intermittent mode is provided wherein the intervals can be selected, on the one hand, as a function of wetting events including rain or another moisture coating on the windshield and as a function of preceding interval times and of the duration of triggered wiping actions. During this process, unfavorable, abrupt changes of the interval times may occur.

SUMMARY AND ADVANTAGES OF THE INVENTION

It is the object of the invention to provide an arrangement of the type mentioned at the outset, wherein a smoothing of the interval times is accomplished in a simple manner.

This object generally is achieved by an arrangement for operating a windshield wiper in either a direct mode wherein a wiping action is triggered directly in the event of a wetting event on the windshield, in an intermittent mode wherein a sequence of wiping actions with a predeterminable interval time is triggered in the event of a corresponding wetting event, or in a continuous mode wherein wiping actions follow one another without a break, with the arrangement having a sensor device for detecting the degree of moisture on the windshield and for emitting a sensor signal, having an evaluation device receiving the sensor signal, which evaluation device is provided with a moisture-detecting stage, an interval time control and a control signal generating device, and having an actuation unit for the windshield wiper which can be actuated by the evaluation device to produce the wiping actions; and wherein the interval time control has a smoothing stage for the interval time ($t_I$, $t_{I+1}$) with which it can be determined during which time segment of predetermined time segments within a first interval time ($t_I$) a wetting event occurs, starting from the beginning of the interval and with which the second interval time ($t_{I+1}$) can be shortened all the more, the earlier the time segment appears during which the wetting event occurs.

Accordingly, it is provided that the interval time control has a smoothing stage for the interval time with which it can be determined during which time segment of predetermined time segments within the interval time a wetting event occurs, starting from the beginning of the interval, and with which the second interval time can be shortened all the more, the earlier the time segment appears during which the wetting event occurs.

In this manner, great, abrupt changes of the interval times during successive wiping actions, which might disturb a driver, can be prevented.

A simple measure for attaining a good smoothing of the interval times is that the interval time is divided into two time segments of identical size, and that the second interval time remains the same as the old one if the wetting event occurs during the second time segment and is reduced by a fixed portion of the old interval time if the wetting event occurs during the first time segment.

Furthermore, disturbing, abrupt changes of the interval time are prevented if it is provided that the interval time of a third interval time, which then follows the second interval time, is shortened by a greater percentage portion than the second interval time if a wetting event occurs during the first time segment of the second interval time and that further interval times are shortened by the same percentage portion as the third interval time if wetting events occur during the first time segment of the respectively preceding interval times.

A further simple measure to improve the smoothing is that the second interval time remains constant if a wetting event occurs outside of the first interval time, that the third interval time is extended by a predetermined percentage portion if a wetting event occurs outside of the third interval time, that a fourth interval time is extended by a greater percentage portion than the third interval time if a wetting event occurs outside of the third interval time, and that switching to the direct mode occurs if a wetting event occurs outside of the fourth interval time.

A feature of the arrangement which provides that switching to the direct mode can only take place if, after a last interval time, a further interval time has passed, prevents that a double wiping occurs during the transition from the intermittent mode to the direct mode.

A further advantageous measure to improve the smoothing of the interval times is attained by the feature of the arrangement which provides that the first time segment is again divided into two time ranges of identical size and that the percentage portion of the shortening of the subsequent interval time is greater if the wetting event occurs during the first time range than if it occurs during the second time range.

In order to clearly define the intermittent mode, it is further provided that the interval times range within a minimum and a maximum limit and that switching takes place to the continuous mode if the minimum limit is not reached and to the direct mode if the maximum limit is exceeded.

A transition to the intermittent mode is attained in a simple and reliable manner in that the intermittent mode can only be reached from the direct mode and that the first interval time is determined from the mean value of the two preceding break times of the direct mode if none of the two times is longer than the maximum limit of the interval time.

The invention is described below in greater detail by way of an embodiment with reference to the drawings.

DETAILED DESCRIPTION OF THE PREFERRED EMBODIMENTS

Figure 1:
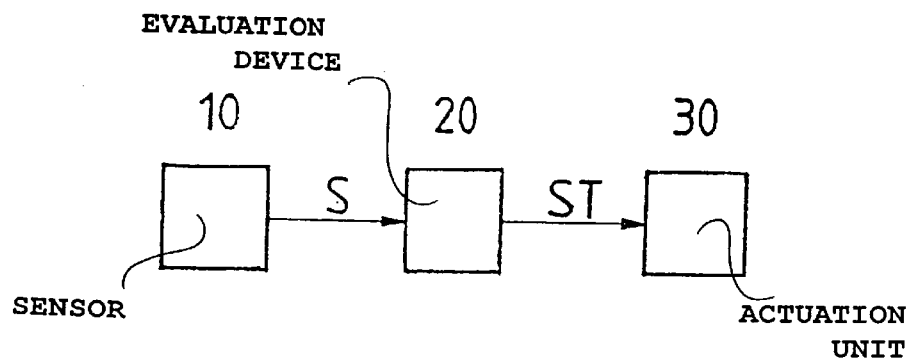
FIG. 1 is a schematic block illustration of an arrangement for operating a windshield wiper.

FIG. 1 illustrates an arrangement for operating a windshield wiper having a sensor device 10 emitting a sensor signal S, which may already be preprocessed, to an evaluation device 20. The evaluation device 20 generates a control signal ST by means of which a suitable wiping operation in accordance with the evaluation of the sensor signal S can be triggered via an actuation unit 30.

Normally, there are provided for such an arrangement a direct mode, wherein wiping operations are triggered, if necessary, in the event of occasional wetting events such as rain, snow or wet dirt; usually there are wiping breaks of different lengths in between the wiping actions. For other wetting events such as drizzle or if the windshield closes up due to fine rain drops during fog, an intermittent mode is triggered, whereas, for example, for normal rain, a continuous mode (without wiping breaks) is switched on.

During the intermittent mode, different interval times $t_{I+1}$ etc. can be selected within a minimum interval time and a maximum interval time by way of the evaluation device 20 as a function of the wetting event. Abrupt changes of the interval times can have a disturbing effect on the driver. Here, according to FIGS. 2 and 3, a smoothing is initiated when the interval times change.

Figure 2:
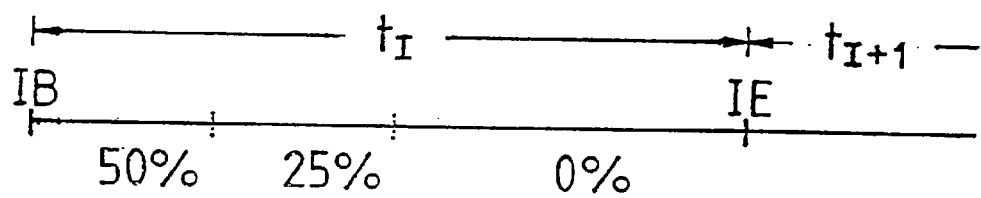
FIG. 2 is an illustration of interval times to explain the operating mode of the arrangement.
Figure 3:
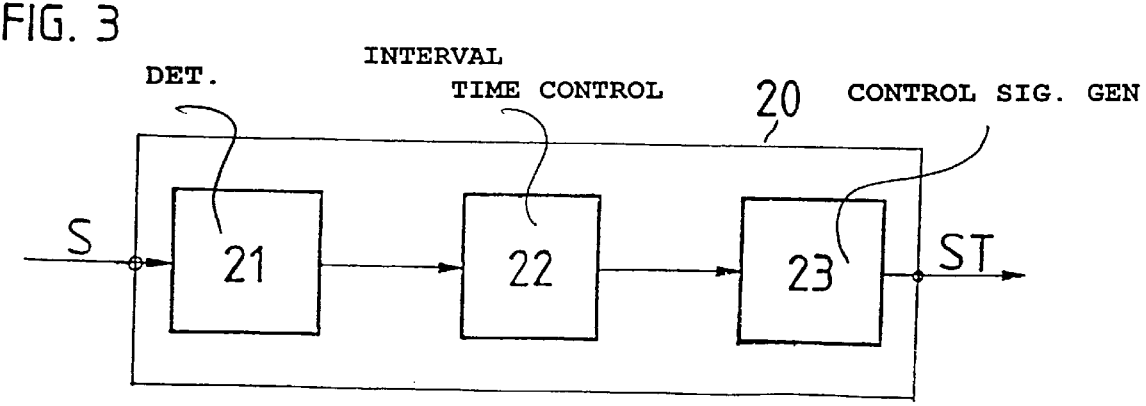
FIG. 3 shows the essential segments of an evaluation device shown in FIG. 1.

For this purpose, according to FIG. 2, an interval time $t_I$ between a beginning of an interval IB and an end of an interval IE is subdivided into two time segments of identical size. The first time segment can further be subdivided into two time ranges of identical size, as is shown in FIG. 2. FIG. 3 shows the essential evaluation stages of the evaluation device 20 in a block diagram.

If a wetting event, which is detected by a detector stage 21, occurs during the second time segment, the then following second interval time $T_{I+1}$ remains unchanged with respect to the old first interval time $t_I$. If a wetting event occurs during the second time range of the first time segment, the second interval time $t_{I+1}$ is extended by 25% with respect to the first interval time $t_I$, whereas the second interval time $t_{I+1}$ is extended by 50% if the wetting event occurs during the first time range of the first time segment. By means of an interval time control 22, an information is correspondingly released to a control signal generating device 23.

Furthermore, the interval time control 22 may be configured such that after an initial shortening of the interval time, an immediately following further shortening is more pronounced if a wetting event occurs during the same time range. If, for example, the second interval time $t_{I+1}$ is shortened by 25% because a wetting event occurs during the second time range of the first time segment, a third interval time is shortened, for example, by 50%, if a wetting event occurs during the second time range of the first time segment of the second interval time $t_{I+1}$. Each further interval time is shortened with respect to the preceding time interval by a further 50% in the event of a wetting event during the respective time range.

If a wetting event occurs, for example, outside of the first interval time $t_I$, the duration of the subsequent second interval time $t_{I+1}$, for example, remains unchanged, whereas in the event of a subsequent extension, the third interval time is extended with respect to the second one, for example, by 25%, and in the event of a third extension, the fourth interval time is extended by 50% compared to the third one. In the event of a further extension, switching to the direct mode preferably takes place.

Due to the direct response of the direct mode to a wetting event—a transition to a direct mode might, unfavorably, immediately trigger another wiping action when a wetting event occurs after a last wiping action in the intermittent mode; it is therefore provided that switching to the direct mode can only take place following a further interval time.

As was already mentioned, the intermittent mode can only be reached from the direct mode. The first interval time is then calculated from the mean value of the last two break times of the direct mode, with a transition to the intermittent mode taking place if the two times are not longer than the maximum interval time.

A smoothened intermittent mode can be accomplished in a simple manner with the above-described measures, while it is possible, however, to adapt the wiping operation quickly enough to changing wetting situations.

Preferably, the evaluation device 20 has a digital design and may comprise the individual stages in a program so as to implement the measures described.

We claim:

1. An arrangement for operating a windshield wiper in either a direct mode wherein, in the event of a wetting event on the windshield, a wiping action is triggered directly, in an intermittent mode wherein, in the event of a corresponding wetting event, a sequence of wiping actions with a predeterminable interval time is triggered, or in a continuous mode wherein wiping actions follow one another without a break, the arrangement having: a sensor device for detecting the degree of moisture on the windshield and for emitting a sensor signal; an evaluation device receiving the sensor signal, which evaluation device is provided with a moisture-detecting stage, an interval time control for operation in the intermittent mode and a control signal generating device; and an actuation unit for the windshield wiper which can be actuated by the evaluation device to produce the wiping actions, and wherein: the interval time control includes smoothing stage means for considering the interval time ($t_I$, $t_{I+1}$) and for determining during which time segment of predetermined time segments within a first interval time ($t_I$) a wetting event occurs, starting from the beginning of the interval (IB), and for shortening a second following interval time ($t_{I+1}$) the earlier the time segment appears during which the wetting event occurs during the first time interval.

2. An arrangement according to claim 1, wherein: each interval time ($t_I$) is divided into two time segments of identical size; and the interval time control causes the second interval time ($t_{I+1}$) to remain the same as the preceding first interval time if the wetting event occurs during the second time segment of the first interval time and to be reduced by a fixed portion of the first interval time ($t_I$) if the wetting event occurs during the first time segment of the first interval time.

3. An arrangement according to claim 1, wherein the smoothing stage means causes the interval time of a third interval time, which then follows the second interval time ($t_{I+1}$), to be shortened by a greater percentage portion than the second interval time ($t_{I+1}$) if a wetting event occurs during the first time segment of the second interval time ($t_{I+1}$), and shortens further interval times by the same percentage portion as the third interval time if wetting events occur during the first time segment of the respectively preceding interval times.

4. An arrangement according to claim 1 wherein said smoothing stage means causes the second interval time ($t_{I+1}$) to remain constant if a wetting event occurs outside of the first interval time, a third interval time to be extended by a predetermined percentage portion if a wetting event occurs outside of the third interval time, that a fourth interval time is extended by a greater percentage portion than the third interval time if a wetting event occurs outside of the third interval time, and switching to the direct mode occurs if a wetting event occurs outside of the fourth interval time.

5. An arrangement according to claim 4 wherein switching to the direct mode can only take place if, after a last interval time, a further interval time has passed.

6. An arrangement according to claim 2 wherein: the first time segment is again divided into first and second time ranges of identical size; and said smoothing means causes the percentage portion of the shortening of the subsequent interval time to be greater if the wetting event occurs during the first time range than if it occurs during the second time range of the first time segment.

7. An arrangement according to claim 1, wherein: the interval times range within a minimum and a maximum limit; and said interval time control causes switching to take place to the continuous mode if the minimum limit is not reached and to the direct mode if the maximum limit is exceeded.

8. An arrangement according to claim 7, wherein the intermittent mode can only be reached from the direct mode; the interval time control determines the first interval time ($t_I$) from the mean value of the two preceding break times of the direct mode if none of the two times is longer than the maximum limit of the interval time.

9. A method for operating a windshield wiper either in a direct mode wherein a wiping action is triggered. directly in the event of a wetting event on the windshield, in an intermittent mode wherein a sequence of wiping actions with a predeterminable interval time is triggered in the event of a corresponding wetting event, or in a continuous mode wherein wiping actions follow one another without a break, said method comprising: detecting the degree of moisture on the windshield and emitting a sensor signal; evaluating the sensor signal to determine the desired mode of wiping action, including controlling time intervals during the intermittent mode; and activating the windshield wipers to produce the desired wiping actions; and wherein the controlling of the time intervals includes: determining during which time segment of predetermined time segments within a first interval time ($t_I$) a wetting event occurs starting from the beginning of the interval (IB), and shortening a second interval time ($t_{I+1}$) all the more, the earlier the time segment appears during which the wetting event occurs.

10. The method according to claim 9, further including: dividing each interval time ($t_I$) into first and second time segments of identical size; and causing the second interval time ($t_{I+1}$) to remain the same as the first interval time if the wetting event occurs during the second time segment, and reducing the second interval time by a fixed portion of the first interval time ($t_I$) if the wetting event occurs during the first time segment.

11. The method according to claim 9 further comprising: shortening the interval time of a third interval time, which follows the second interval time ($t_{I+1}$), by a greater percentage portion than the second interval time ($t_{I+1}$) if a wetting event occurs during the first time segment of the second interval time ($t_{I+1}$); and shortening further interval times by the same percentage portion as the third interval time if wetting events occur during the first time segment of the respectively preceding interval times.

12. The method according to claim 11 further comprising: causing the second interval time ($t_{I+1}$) to remain constant if a wetting event occurs outside of the first interval time; extending the third interval time by a predetermined percentage portion if a wetting event occurs outside of the third interval time; extending a fourth interval time by a greater percentage portion than the third interval time if a wetting event occurs outside of the third interval time: and, switching to the direct mode if a wetting event occurs outside of the fourth interval time.

13. The method according to claim 12, wherein switching to the direct mode takes place only if, after a last interval time, a further interval time has passed.

14. The method according to claim 10, further comprising: dividing the first time segment into first and second time ranges of identical size, and, causing the percentage portion of the shortening of the subsequent interval time to be greater if the wetting event occurs during the first time range than if it occurs during the second time range of the firs time segment.

15. The method according to claim 14, wherein: the first and second interval times range within a minimum and a maximum limit; and, switching to the continuous mode takes place if the minimum limit is not reached and switching to the direct mode take place if the maximum limit is exceeded.

16. The method according to claim 15, wherein switching to the intermittent mode can only be reached from the direct mode: and further including determining the first interval time ($t_I$) from the mean value of two preceding break times of the direct mode if none of the two times is longer than the maximum limit of the interval time.

* * * * *